Nov. 17, 1925.
A. B. PATTON
1,562,250
ICE CREAM DISPENSING MACHINE
Filed March 25, 1924     3 Sheets-Sheet 1
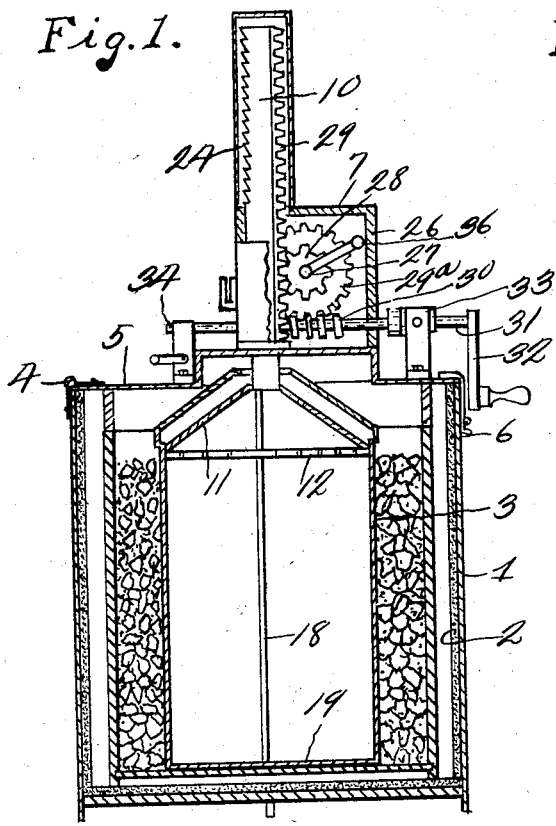
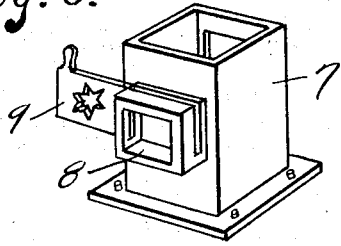
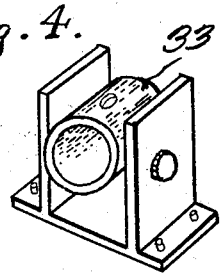
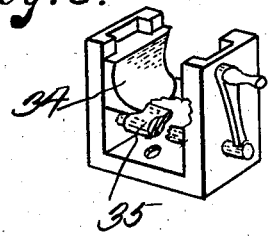
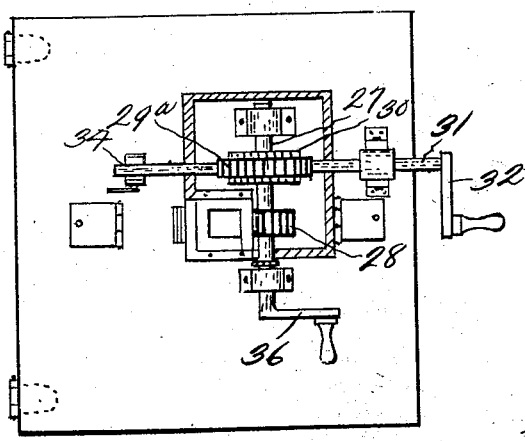
INVENTOR.
A. B. Patton
BY
ATTORNEY.

Nov. 17, 1925.
A. B. PATTON
1,562,250
ICE CREAM DISPENSING MACHINE
Filed March 25, 1924      3 Sheets-Sheet 2
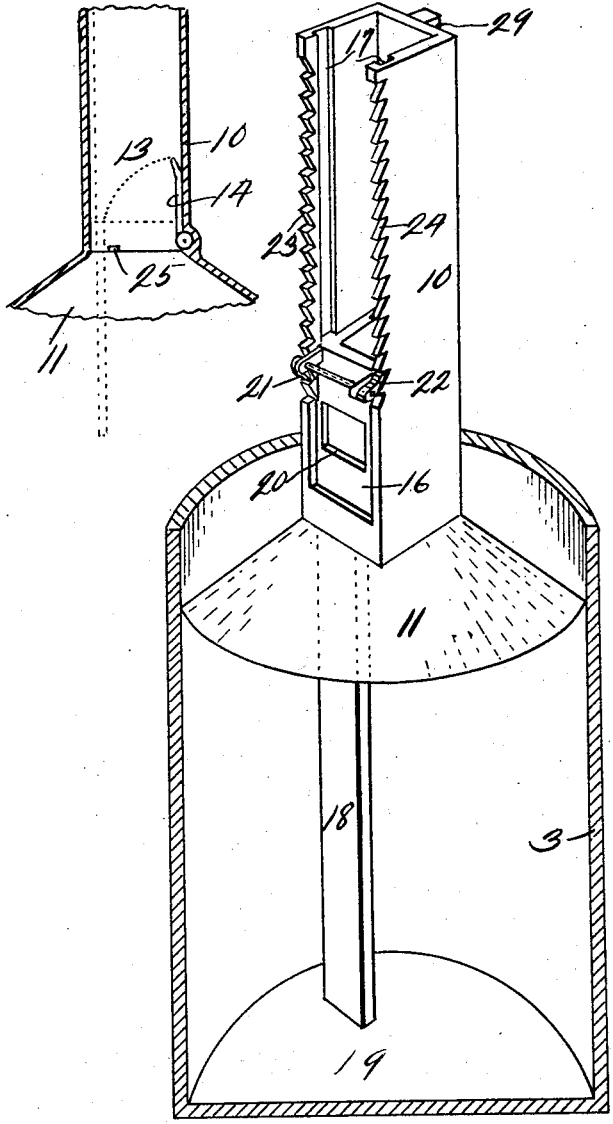
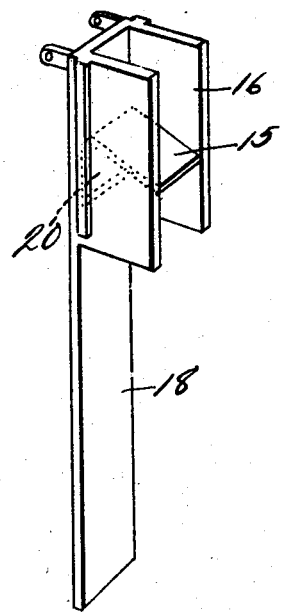
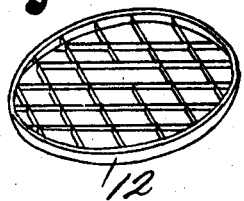
INVENTOR.
A. B. Patton Nov. 17, 1925.  
A. B. PATTON  
1,562,250  
ICE CREAM DISPENSING MACHINE  
Filed March 25, 1924   3 Sheets-Sheet 3
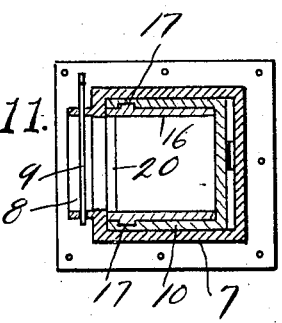
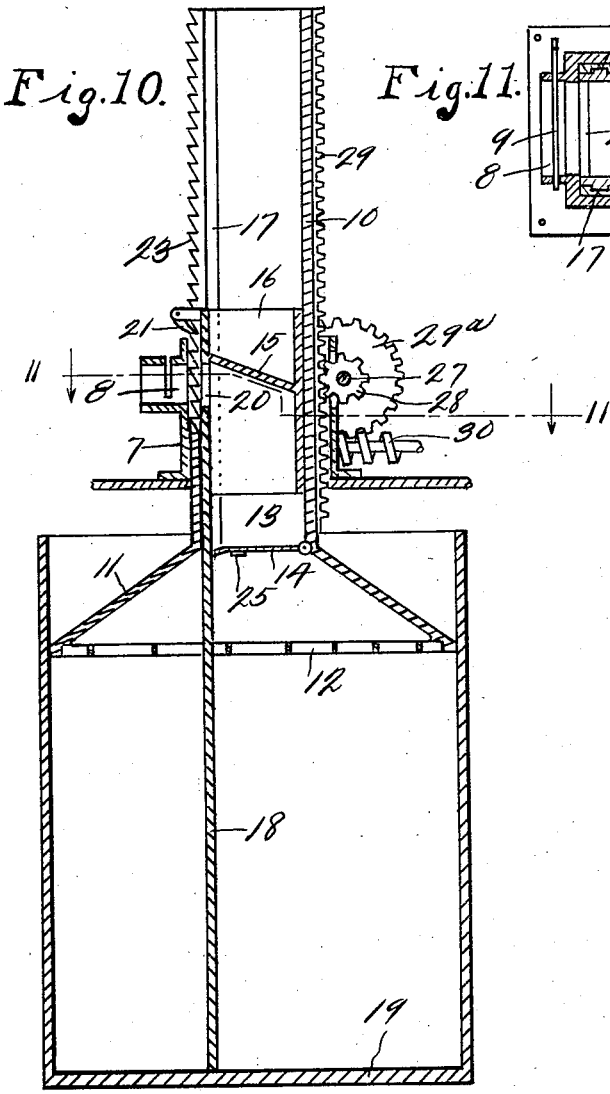
INVENTOR.  
A. B. Patton  
BY  
ATTORNEY.

Patented Nov. 17, 1925.

1,562,250

UNITED STATES PATENT OFFICE.

ARTHUR B. PATTON, OF OMAHA, NEBRASKA.

ICE-CREAM-DISPENSING MACHINE.

Application filed March 25, 1924. Serial No. 701,688.

*To all whom it may concern:*

Be it known that ARTHUR B. PATTON, a citizen of the United States, residing at Omaha, in the county of Douglas and State of Nebraska, has invented certain new and useful Improvements in Ice-Cream-Dispensing Machines, of which the following is a specification.

The invention relates to ice cream dispensing machines, and has for its object to provide a device of this character which will deliver ice cream direct from its container in a rapid and convenient manner, without the use of dippers or the necessity of uncovering the container, or in any way subjecting the ice cream to unsanitary conditions during the transmission of the ice cream from the container to a receptacle, in which it is delivered to the purchaser.

A further object is to provide an ice cream dispensing machine adapted to be attached to the upper end of a tub, in which an ice cream container is disposed, and provided with a plunger adapted to be forced down into the container under considerable pressure for forcing the ice cream upwardly through a tubular member carried by the upper end of the plunger, and delivering the same from a delivery opening therein.

A further object is to provide rack and gear means for forcing the plunger downwardly with considerable power.

A further object is to provide a rectangular shaped stationary casing around the tubular member carried by the plunger, and having a delivery opening therein, which delivery opening registers with an opening in a deflecting casing disposed within the tubular member, and a downwardly extending arm cooperating with the bottom of the container for maintaining the deflecting casing in proper position upon the downward movement of the plunger casing. Also to provide the deflecting casing with dogs cooperating with ratchet teeth on the plunger casing whereby it may be raised or lowered with the plunger casing and maintained in a position where its discharge opening will register with the discharge opening of the rectangular stationary casing surrounding the plunger casing.

A further object is to provide a pivoted closure in the lower end of the plunger casing for preventing ice cream forced into the plunger casing from dropping out of the plunger casing when the plunger casing is raised.

A further object is to provide the lower end of the conically shaped plunger with an apertured member, which apertured member allows upward passage of ice cream, but holds ice cream, which has been forced into the conically shaped plunger from dropping out of the plunger when the plunger is raised.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a vertical transverse sectional view through the device showing the same attached to a conventional form of ice cream chest.

Figure 2 is a top plan view of the device, showing the same applied to the chest and part of the casing broken away.

Figure 3 is a perspective view of the rectangular shaped casing surrounding the plunger casing.

Figure 4 is a perspective view of the tiltable bearing for the operating shaft.

Figure 5 is a perspective view of the movable bearing for the end of the operating shaft.

Figure 6 is an enlarged detail sectional view through a portion of the conically shaped plunger and the casing carried thereby.

Figure 7 is a perspective view of the plunger and its casing, showing the same disposed in the ice cream container.

Figure 8 is a perspective view of the deflecting casing.

Figure 9 is a perspective view of the apertured member carried by the conically shaped plunger.

Figure 10 is an enlarged transverse sectional view through the device, and the ice cream container.

Figure 11 is a horizontal sectional view taken on line 11—11 of Figure 10.

Referring to the drawing, the numeral 1 designates a conventional form of ice cream chest, of the type used in stores and the like, and which is preferably provided with insulating material 2. Disposed within the chest 1 is a metallic ice cream container 3, which is usually round. Hingedly connected at 4 to the chest 1 is a cover 5, which cover is held in closed position by means of a hasp 6, and secured to the upper side of the cover 5 is a rectangular shaped casing 7, one side of which is provided with a discharge opening 8, through which ice cream is discharged into a receptacle for delivery to purchaser. The casing 7 is provided with a door 9, which when closed prevents ice cream from passing through the delivery opening 8. Slidably mounted in the casing 7 is a vertically disposed plunger casing 10, which is substantially U-shaped in a horizontal cross section as shown in Figure 11, and which plunger casing terminates at its lower end in a conically shaped plunger 11, which is adapted to be forced downwardly into the ice cream container 3, under considerable pressure, for forcing ice cream in the container 3 upwardly through the apertured member 12 carried by the lower end of the plunger, and through the chamber 13 of the plunger casing 10, at which time the ice cream forces the trap door 14 upwardly to an open position, and it will be seen by the continued downward movement of the plunger 11, the ice cream will come into engagement with the deflecting plate 15, carried by the deflecting casing 16, and ice cream will be forced through the discharge opening 8 in the casing 7, where it may be placed in containers. The deflecting casing 16 is slidably mounted in guide channels 17, in the side walls of the plunger casing 10, therefore it will be seen that when the downwardly extended arm 18 carried by the deflecting casing 16, is in engagement with the bottom 19 of the container 3, the discharge opening 20 of the deflecting casing 16 will be maintained in registration with the discharge opening 8 of the casing 7, at all times. However when it is desired to raise or lower the deflecting casing 16, the lifting pawl 21 or the lowering pawl 22 may be placed in cooperative engagement with the ratchet teeth 23 or 24 carried by the plunger casing 10, therefore it will be seen that when applying the device to the container 3, the arm 18 may be forced downwardly into the ice cream by locking the deflecting casing 16 to the plunger casing 10, or attaching said deflecting casing to the plunger casing in a manner whereby it will be raised with the plunger casing.

The trap door 14 is limited in its downward movement by engagement with the lug 25, therefore it will be seen that when the plunger casing 10 is raised, ice cream disposed therein will not drop out of the chamber 13. The apertured member 12 carried by the lower end of the conically shaped plunger 11 prevents ice cream from dropping out of the plunger when said plunger is raised, for instance after it has reached the bottom of the container 3, therefore it will be seen that all of the ice cream may be removed from the container.

Extending transversely of the casing 26 carried by the cover 1 is a shaft 27, which shaft is provided with a gear 28 which meshes with a rack 29 carried by one side of the plunger casing 10, and it will be seen that when said shaft 27 is rotated the plunger casing 10 will be forced downwardly or upwardly according to the direction of rotation of the shaft 27. To insure sufficient power for forcing the plunger 11, downwardly, and consequently forcing ice cream upwardly through the chamber 13, the shaft 27 is provided with a worm gear $29^a$, with which worm gear a worm 30 meshes, and which worm when rotated allows the application of considerable power on the plunger 11. Worm 30 is carried by operating shaft 31, which operating shaft is provided with a crank 32, whereby it may be easily rotated. The shaft 31 is rotatably mounted in a tiltable bearing 33 at one end, and in a vertical slidable bearing 34 at the other end, which bearing 34 is controlled by a cam 35, which cam when in lowered position allows the worm 30 to move out of mesh with the worm gear $29^a$, and consequently allows the shaft 27 to be rotated by the auxiliary crank 36 without interference from the worm 30, thereby allowing direct raising of the plunger casing 10.

From the above it will be seen that an ice cream dispensing device is provided, whereby ice cream may be easily and quickly forced from an ice cream container for delivery to purchasers, thereby obviating the constant exposure of the ice cream incident to removing covers from the container which is now the common difficulty with ice cream as at present vended. It will also be seen that the device is simple in construction, and means is provided whereby considerable power will be applied to the plunger for forcing the ice cream through the discharge casing.

The invention having been set forth what is claimed as new and useful is:—

The combination with a device for dispensing ice cream from ice cream containers, said device comprising a plunger disposed in the casing, a tubular casing carried by said plunger, and through which ice cream is forced, a deflecting casing disposed within the plunger casing and slidably mounted therein, and having a discharge opening registering with the discharge opening in the plunger casing, of means for preventing movement of the deflecting casing, said means comprising an arm carried by the deflecting casing and engaging the bottom of the container, pawl and ratchet means for locking the deflecting casing to the plunger casing whereby said deflecting casing may move upwardly or downwardly with the plunger casing and gear means cooperating with the plunger casing for moving said plunger casing.

In testimony whereof I affix my signature this 1st day of March 1924.

ARTHUR B. PATTON.